United States Patent
Lin et al.

(10) Patent No.: US 8,254,439 B2
(45) Date of Patent: Aug. 28, 2012

(54) APPARATUS AND METHODS FOR MOTION VECTOR CORRECTION

(75) Inventors: Siou-Shen Lin, Taipei County (TW); Te-Hao Chang, Taipei (TW); Chin-Chuan Liang, Taichung (TW)

(73) Assignee: Mediatek Inc., Hsinchu (TW)

( * ) Notice: Subject to any disclaimer, the term of this patent is extended or adjusted under 35 U.S.C. 154(b) by 554 days.

(21) Appl. No.: 12/437,693

(22) Filed: May 8, 2009

(65) Prior Publication Data
US 2010/0284627 A1    Nov. 11, 2010

(51) Int. Cl.
*H04N 7/12* (2006.01)
*H04N 11/02* (2006.01)
*G06K 9/00* (2006.01)

(52) U.S. Cl. ............ 375/240; 382/107; 375/240.15
(58) Field of Classification Search .......... 375/240
See application file for complete search history.

(56) References Cited

U.S. PATENT DOCUMENTS

| | | | |
|---|---|---|---|
| 5,317,397 A * | 5/1994 | Odaka et al. | 375/240.15 |
| 5,936,671 A * | 8/1999 | Van Beek et al. | 375/240.14 |
| 2004/0218828 A1* | 11/2004 | Aiso | 382/254 |
| 2006/0268988 A1* | 11/2006 | Sun et al. | 375/240.16 |
| 2007/0002058 A1 | 1/2007 | Wittebrood | |
| 2007/0092111 A1* | 4/2007 | Wittebrood et al. | 382/107 |

* cited by examiner

Primary Examiner — Sath V Perungavoor
Assistant Examiner — Xiaolan Xu
(74) Attorney, Agent, or Firm — Thomas|Kayden (57) ABSTRACT

A motion vector correction apparatus for correcting an estimated motion vector for a pixel located at a position of an interpolated frame between a first and a second frame is provided, including a three-frame motion estimation unit estimating a previous and a following motion vector fields; a motion vector selection unit determining a set of reference motion vectors associated with the first and second frame for the position of the pixel, wherein the reference motion vectors include a first motion vector set as the estimated motion vector and a pair of corresponding motion vectors from the previous and following motion vector fields; and a motion vector correction unit obtaining a measure of consistency between the corresponding motion vectors, adapting a plurality of weighted factors according to the measure of consistency and correcting the estimated motion vector according to the adapted weighted factors and the set of reference motion vectors.

24 Claims, 9 Drawing Sheets

MF3frm(MV,n-1)  MF2frm(MV,n+α)  MF3frm(MV,n)

APPARATUS AND METHODS FOR MOTION VECTOR CORRECTION

BACKGROUND OF THE INVENTION

1. Field of the Invention

The invention relates to video processing, and in particular to processes which involve motion vector correction for frame rate conversion.

2. Description of the Related Art

Generally, frame rate conversion is used for video standard conversion. For example, a video signal recorded at a frame rate of 24 frames per second (i.e., Hz) may need to be converted to display at a higher display frame rate, such as a 50 Hz television signal under a PAL standard. Moreover, when the 50 Hz television signal under the PAL standard is replayed as a 60 Hz television signal under an NTSC standard, a conversion of the television signals is also required to convert the display frame rate is converted from 50 Hz to 60 Hz.

In this case, frame repetition methods, such as pull-down conversions, are commonly used to perform frame rate up-conversion by repeating frames. However, frame repetition may generate undesirable judder artifacts, when objects or backgrounds of the frames are moving, thus resulting in deterioration of video quality.

To remove the defects of frame rate conversion caused by motion of objects in frames, a technique of motion judder cancellation (MJC) involving motion estimation/motion compensation (ME/MC) has been proposed. Motion judder cancellation generates an intermediate frame by spatially interpolating the position of objects from two or more successive frames according to motion vector information, so as to reduce judder artifacts. Since the motion vector information describes the movements of the objects, most pixels of the intermediate frame along the object motion can be well interpolated along corresponding motion vectors. However, interpolation error may occur around edges of objects in motion, especially during acceleration or retardation. If incorrect edge information derived from motion estimation fails to match the real edges of moving objects, unnatural ringing artifacts or a so-called "halo", are formed as jagged contours or fuzzy lines in the vicinity of the sharp edges of the moving objects within the intermediate frame.

Thus, it is crucial to perform motion vector correction for frame rate conversion that achieves removal of visible artifacts on the edges of moving objects within an intermediate frame.

BRIEF SUMMARY OF INVENTION

The invention provides a motion vector correction method for correcting an estimated motion vector for a pixel located at a position of an interpolated frame between a first frame and a second frame of a video sequence, including the steps of: estimating a previous motion vector field and a following motion vector field, wherein the previous motion vector field is estimated on the basis of the first frame, the second frame and a third frame preceding the second frame and the following motion vector field is estimated on the basis of the first frame, the second frame and a fourth frame following the first frame; determining a set of reference motion vectors associated with the first frame and the second frame for the position of the pixel, wherein the set of reference motion vectors comprises a first motion vector set as the estimated motion vector and a pair of corresponding motion vectors respectively from the previous motion vector field and the following motion vector field; obtaining a measure of consistency between the pair of corresponding motion vectors; adapting a plurality of weighted factors respectively associated with the set of reference motion vectors according to the measure of consistency; and correcting the estimated motion vector according to the adapted weighted factors and the set of reference motion vectors.

In addition, the invention provides a motion vector correction apparatus for correcting an estimated motion vector for a pixel located at a position of an interpolated frame between a first frame and a second frame of a video sequence, including a three-frame motion estimation unit, a motion vector selection unit and a motion vector correction unit. The three-frame motion estimation unit estimates a previous motion vector field and a following motion vector field, wherein the previous motion vector field is estimated on the basis of the first frame, the second frame and a third frame preceding the second frame and the following motion vector field is estimated on the basis of the first frame, the second frame and a fourth frame following the first frame. The motion vector selection unit is coupled to the three-frame motion estimation unit for determining a set of reference motion vectors associated with the first frame and the second frame for the position of the pixel, wherein the set of reference motion vectors comprises a first motion vector set as the estimated motion vector and a pair of corresponding motion vectors respectively from the previous motion vector field and the following motion vector field. The motion vector correction unit is coupled to the motion vector selection unit for obtaining a measure of consistency between the pair of corresponding motion vectors, adapting a plurality of weighted factors respectively associated with the set of reference motion vectors according to the measure of consistency, and correcting the estimated motion vector according to the adapted weighted factors and the set of reference motion vectors.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
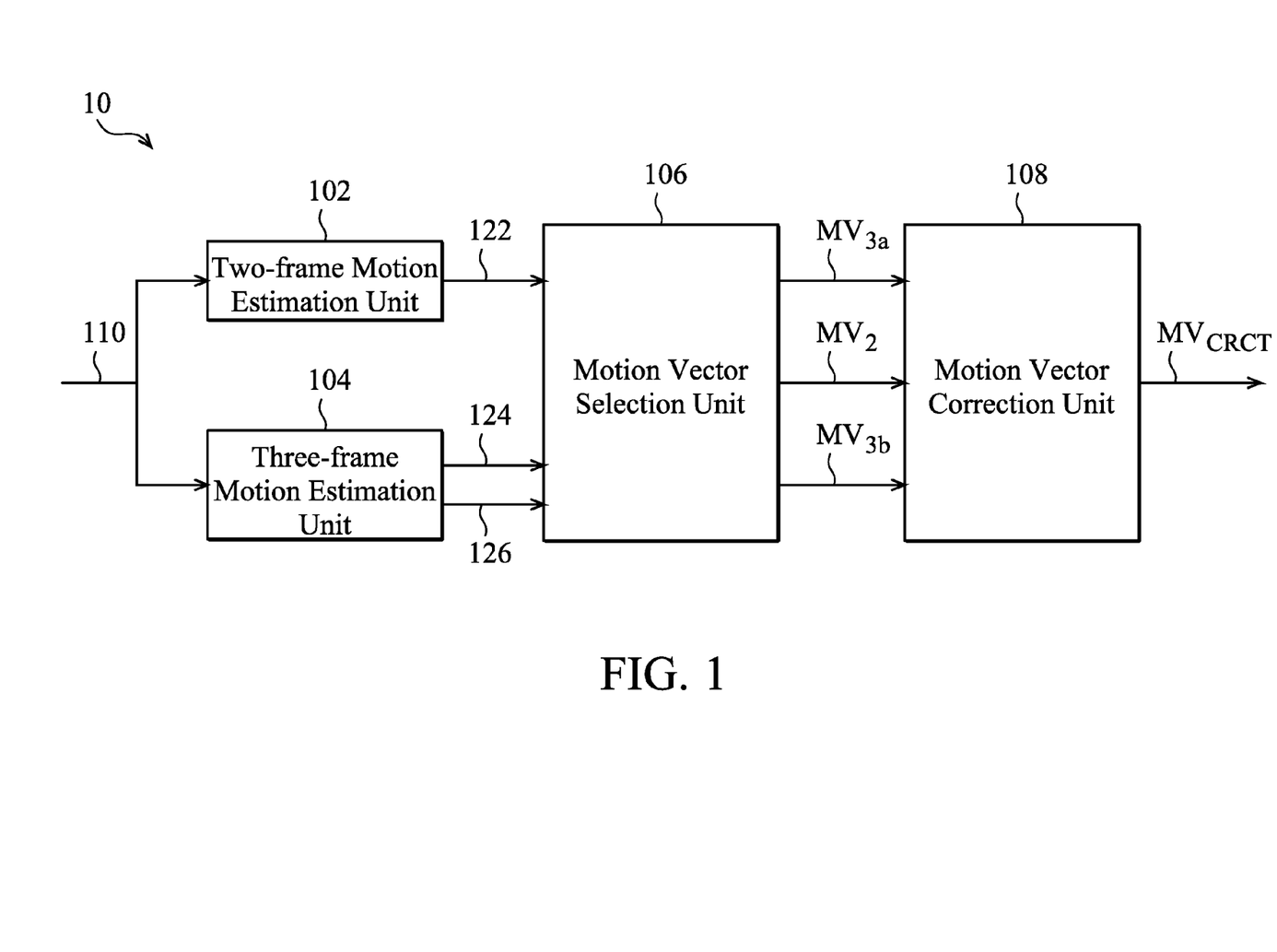
FIG. 1 is a block diagram illustrating a motion vector correction apparatus according to an embodiment of the invention.

FIG. 1 is a block diagram illustrating a motion vector correction apparatus 10 according to an embodiment of the invention. As shown in FIG. 1, the motion vector correction apparatus 10 comprises a two-frame motion estimation unit 102, a three-frame motion estimation unit 104, a motion vector selection unit 106 and a motion vector correction unit 108. The motion vector correction apparatus 10 is used to correct an estimated motion vector for a pixel located at a position of an interpolated frame between two frames of a video sequence 110.

Referring to FIG. 1, the two-frame motion estimation unit 102 and the three-frame motion estimation unit 104 derive motion vectors from a plurality of frames in an video sequence 110. Specifically, the two-frame motion estimation unit 102 is used to estimate an intermediate motion vector field 122 on the basis of a first frame and a second frame from the video sequence 110.

According to an embodiment, the interpolated frame between the two known first and the second frame may be determined according to the intermediate motion vector field 122. During operation, when a moving object accelerates, some non-overlapped occlusion areas are formed between the fast moving object and the static background, as shown in FIG. 2.

Figure 2:
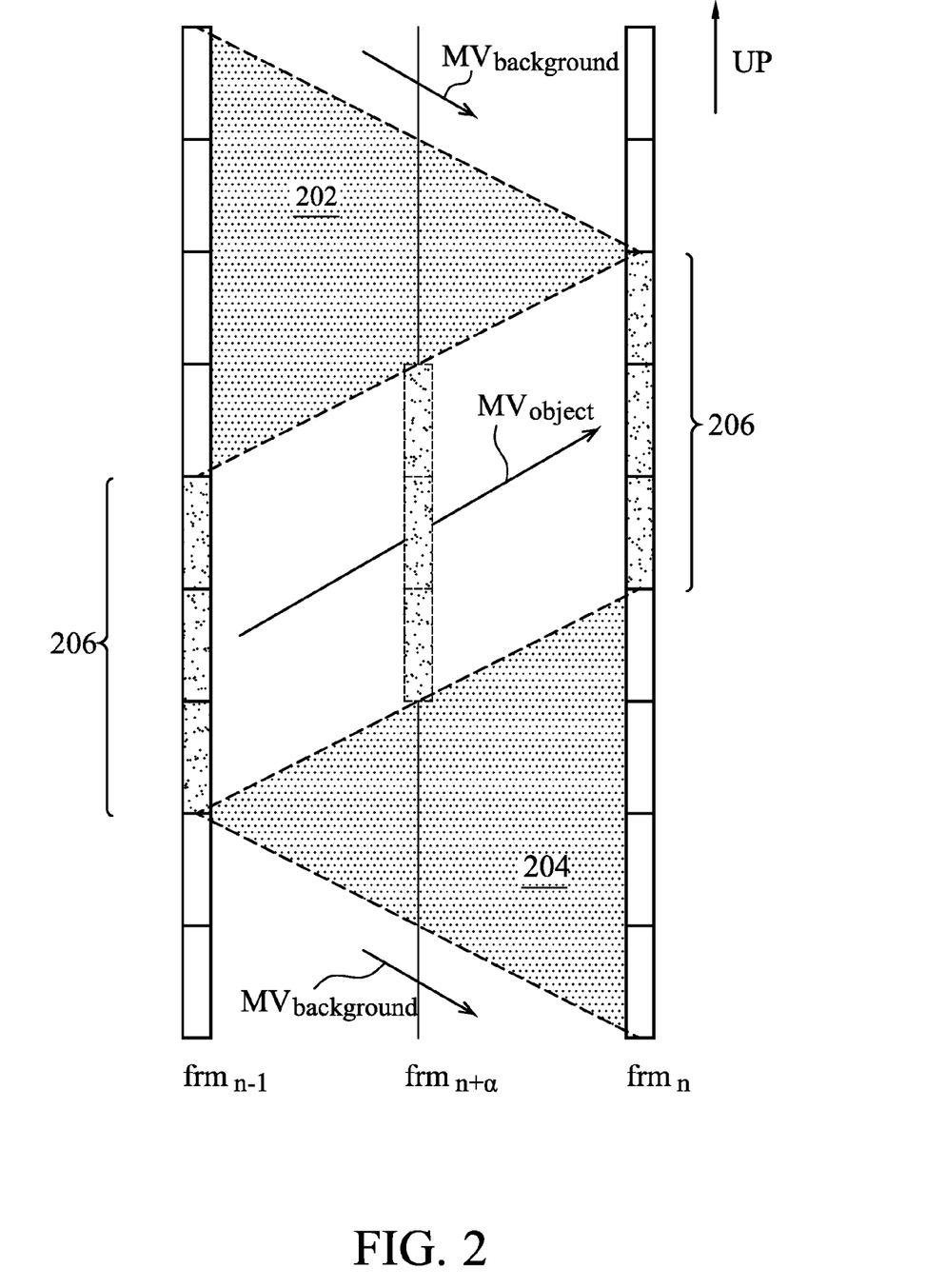
FIG. 2 is a diagram schematically illustrating a covered area and an uncovered area described by the motion of a foreground object and the background between two frames.

FIG. 2 is a diagram schematically illustrating a covered area and an uncovered area described by the motion of a foreground object and the background between two frames.

As shown in FIG. 2, a first and second frames corresponding to time instant t1 and t2 with t1 later than t2 are denoted by $frm_n$ and $frm_{n-1}$, respectively. Then, a frame to be interpolated $frm_{n+\alpha}$ with $-1 \leq \alpha \leq 0$ specifying a temporal or chronological correlation between the two frames $frm_{n-1}$ and $frm_n$ is generated. An object 206 moves with a specific speed over a background and in an upward direction UP. Thus, the movement of the object 206 may be represented by an estimated motion vector $MV_{object}$. Similarly, the movement of the background may be represented by a motion vector $MV_{background}$. In addition, the motion of the object 206 and the background may result in some occlusion areas. For example, when the object 206 is moving over the background, two occlusion areas respectively referred to a covered area 202 and an uncovered area 204 are formed between the moving object 206 and the background. Since pixels within the covered area 202 and the uncovered area 204 are present in one frame only, motion estimation will not find matched block in these two frames $frm_{n-1}$ and $frm_n$. As such, estimation of the motion vectors involving the covered area 202 and the uncovered area 204 are not sufficiently determined. As mentioned above, the erroneously estimated motion vectors may cause distortion or dragging artifacts on the border during motion variations within the interpolated frame $frm_{n+\alpha}$. In the illustrated embodiment of FIG. 1, the three-frame motion estimation unit 104 is further used to correct the erroneous motion vectors.

During operation, the three-frame motion estimation unit 104 is used to estimate a previous motion vector field 124 and a following motion vector field 126 which are associated with the intermediate motion vector field 122. In this illustrated embodiment, the process of correcting the erroneous motion vectors with the two occlusion areas as shown in FIG. 2 will be described below in more detail with reference to FIGS. 3-5.

Figure 3:
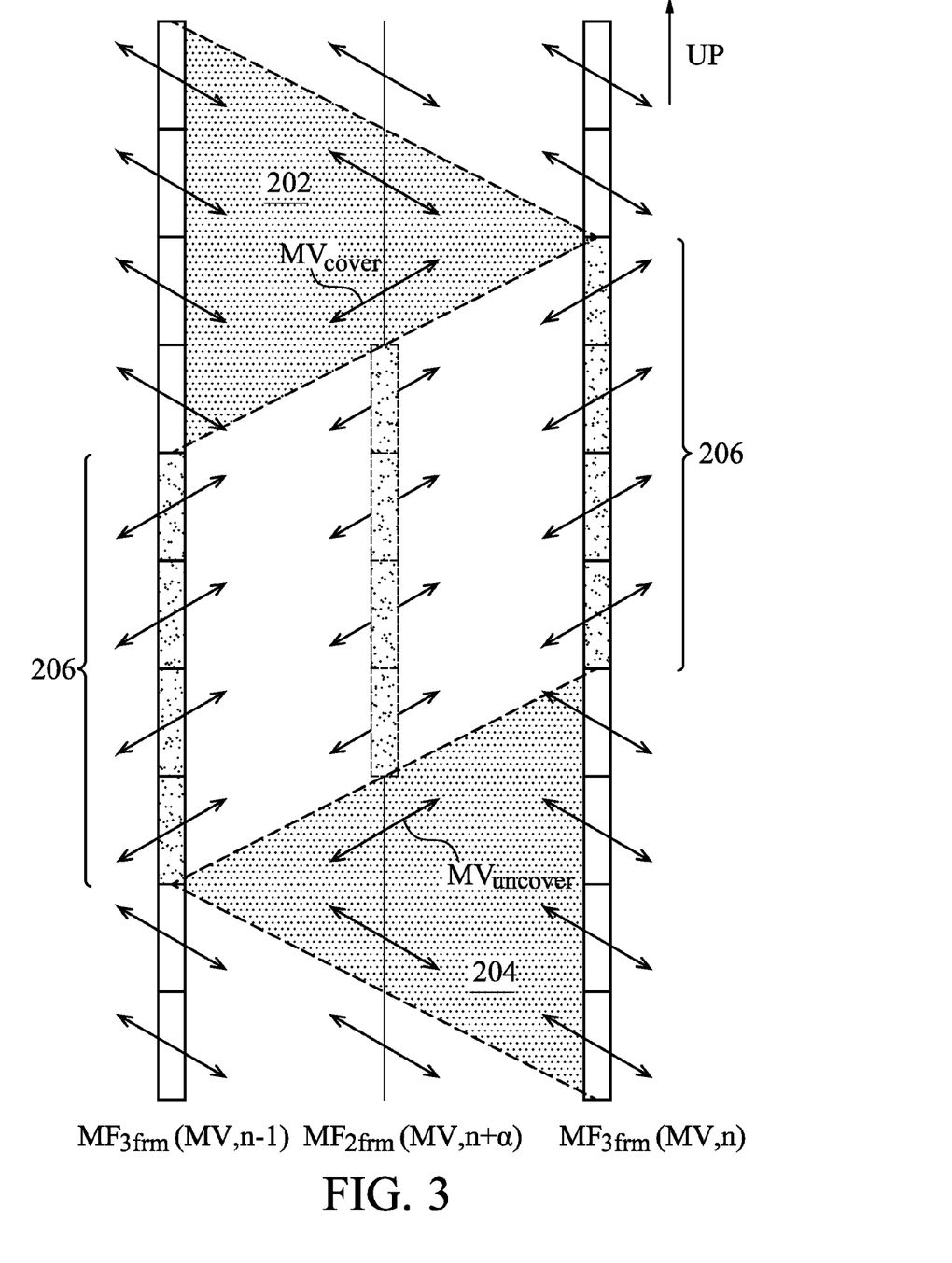
FIG. 3 is a diagram illustrating three motion vector fields for motion vector correction according to an embodiment of the invention.

FIG. 3 is a diagram illustrating three motion vector fields for motion vector correction according to an embodiment of the invention. As shown in FIG. 3, three motion vector fields are used to derive correct motion vectors for the interpolated frame $frm_{n+\alpha}$. According to this illustrated embodiment, the intermediate motion vector field 122 (as shown in FIG. 1) is defined as follow:

$$MF_{2frm}(MV,n+\alpha)=F(frm_{n-1},frm_n), \qquad (1)$$

wherein the intermediate motion vector field 122 is a two-frame motion estimator intermediated from the two frames $frm_{n-1}$ and $frm_n$.

Further, the previous motion vector field 124 is defined as follow:

$$MF_{3frm}(MV,n-1)=F(frm_{n-2},frm_{n-1},frm_n), \qquad (2)$$

wherein the previous motion vector field 124 is a three-frame motion estimator estimated between frames $frm_{n-1}$, $frm_n$ and a frame $frm_{n-2}$ preceding the frame $frm_{n-1}$.

Further, the following motion vector field 126 is defined as follow:

$$MF_{3frm}(MV,n)=F(frm_{n-1},frm_n,frm_{n+1}), \qquad (3)$$

wherein the following motion vector field 126 is also a three-frame motion estimator estimated between frames $frm_{n-1}$, $frm_n$ and a frame $frm_{n+1}$ following the first frame $frm_n$.

As shown in FIG. 3, motion vectors associated with the covered area 202 above the moving object 206 in the motion vector field $MF_{2frm}(MV,n+\alpha)$ cannot be correctly estimated since the moving object 206 overlaps the corresponding area in the motion vector field $MF_{3frm}(MV,n)$. Similarly, motion vectors associated with the uncovered area 204 below the moving object 206 in the motion vector field $MF_{2frm}(MV,n+\alpha)$ cannot be correctly estimated since no motion information of the corresponding area is derived from the motion vector field $MF_{3frm}(MV,n-1)$. Accordingly, the boundary of the moving object 206 is not smooth and dragged due to erroneous motion vectors, such as $MV_{cover}$ and $MV_{uncover}$ as shown in FIG. 3.

According to an embodiment, frames $frm_{n-2}$, $frm_{n-1}$, $frm_n$, $frm_{n+1}$ may be successive frames in the video sequence 110 as shown in FIG. 1. In other embodiments, frames $frm_{n-2}$, $frm_{n-1}$, $frm_n$, $frm_{n+1}$ may be chronologically discrete frames in the video sequence 110.

Figure 4:
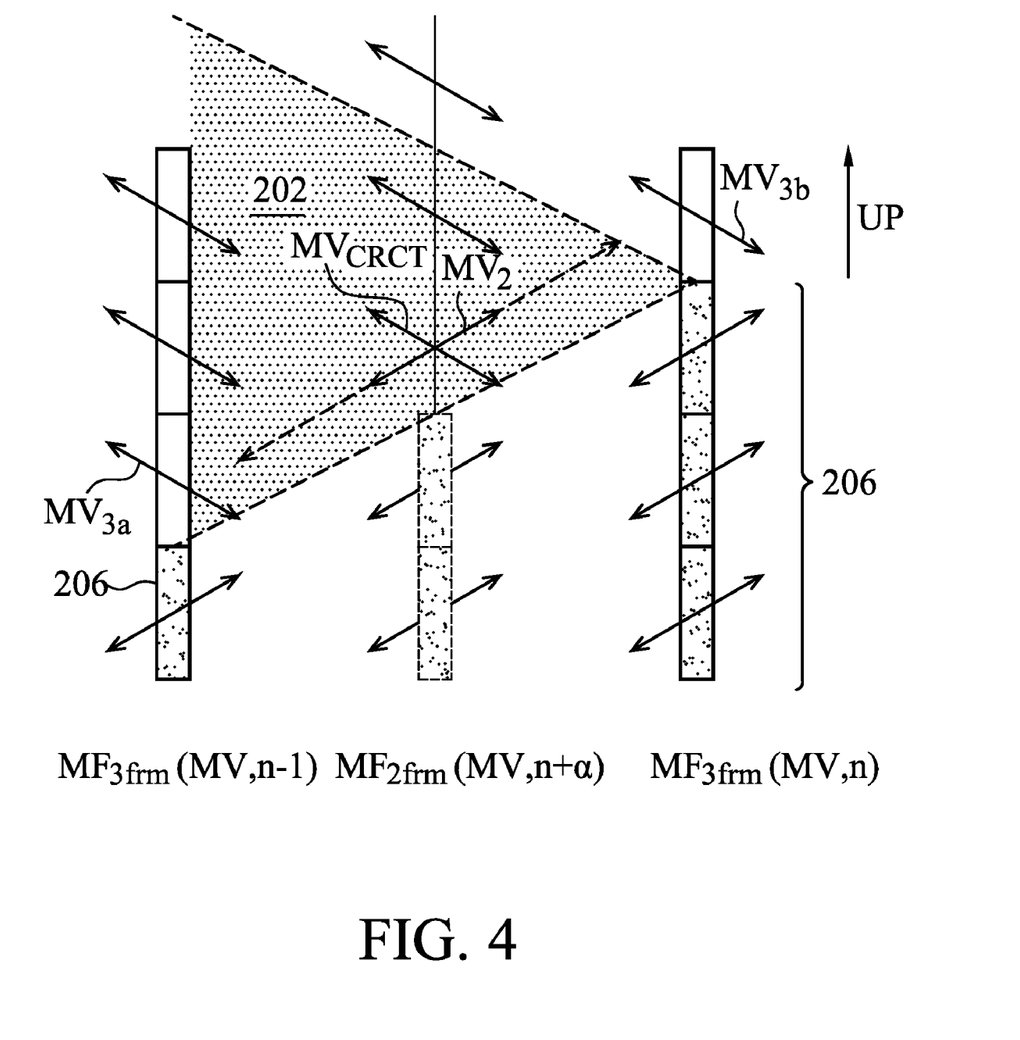
FIG. 4 is a diagram illustrating an operation of correcting motion vectors located in a covered area according to the embodiment of FIG. 3.

FIG. 4 is a diagram illustrating an operation of correcting motion vectors located in a covered area 202 according to the embodiment of FIG. 3.

Referring to FIGS. 1, 2 and 4, the motion vector selection unit 106 is coupled to the two-frame motion estimation unit 102 and the three-frame motion estimation unit 104 for determining a set of reference motion vectors for correcting an estimated motion vector of the interpolated frame $frm_{n+\alpha}$ as illustrated in FIG. 2. Assuming the estimated motion vector for a pixel located at a position of the interpolated frame $frm_{n+\alpha}$ is specified, the set of reference motion vectors associated with the two frames $frm_{n-1}$ and $frm_n$. is then determined according to the position of the pixel. According to an embodiment, a candidate motion vector selected from the intermediate motion vector field 122 is set as the estimated motion vector of the interpolated frame $frm_{n+\alpha}$ to be corrected. Note that the location of the candidate motion vector in the intermediate motion vector field 122 corresponds to that of the pixel in the interpolated frame $frm_{n+\alpha}$. For example, the motion vector selection unit 106 detects the covered area 202 and selects corresponding motion vectors therefrom, such as $MV_2$ in FIG. 4. Additionally, according to the selected motion vector $MV_2$, the motion vector selection unit 106 also determines a pair of corresponding motion vectors respectively from the previous motion vector field 124 and the following motion vector field 126, e.g., $MV_{3a}$ and $MV_{3b}$ in FIG. 4. In this case, the pair of corresponding motion vectors $MV_{3a}$ and $MV_{3b}$ is determined in the direction of the motion vector $MV_2$. Subsequently, the three motion vectors $MV_2$, $MV_{3a}$ and $MV_{3b}$ are passed to the motion vector correction unit 108.

During operation, the motion vector correction unit 108 coupled to the motion vector selection unit obtains a measure of consistency between the pair of corresponding motion vectors $MV_{3a}$ and $MV_{3b}$. That is, the motion vector pair $MV_{3a}$ and $MV_{3b}$ acquired by the motion vector selection unit 106 is checked to determine whether they are consistent or inconsistent. The operation of checking motion consistency between the motion vector pair $MV_{3a}$ and $MV_{3b}$ guarantees a reliable estimation for correcting the motion vector $MV_2$. For example, the motion vector pair $MV_{3a}$ and $MV_{3b}$ may be checked for consistency by applying a predetermined threshold. In detail, the predetermined threshold is compared with an absolute value of the difference between the motion vector pair $MV_{3a}$ and $MV_{3b}$, so as to determine the measure of consistency. When the absolute value exceeds the predetermined threshold, the motion vector pair $MV_{3a}$ and $MV_{3b}$ is determined to be inconsistent and uncertain. Otherwise, the motion vector pair $MV_{3a}$ and $MV_{3b}$ is determined to be consistent and reliable.

After checking the motion consistency of the motion vector pair $MV_{3a}$ and $MV_{3b}$, the motion vector correction unit 108 then adapts a plurality of weighted factors respectively assigned to the motion vectors $MV_2$, $MV_{3a}$ and $MV_{3b}$. More specifically, referring to FIG. 4, when the motion vector pair $MV_{3a}$ and $MV_{3b}$ is consistent, they serve as reliable references for correcting the motion vector $MV_2$. In this case, the motion vector correction unit 108 makes the weighted factor assigned to the motion vectors $MV_2$ that has a sufficiently lower value than other weighted factors assigned to the motion vector pair $MV_{3a}$ and $MV_{3b}$. For example, the motion vectors $MV_2$ weighted with a zero weighted factor, and the weighted factors suitable for the motion vector pair $MV_{3a}$ and $MV_{3b}$ may have the same value of ½. As a result, the motion vector correction unit 108 corrects the motion vectors $MV_2$ of the covered area 202 to a new $MV_{CRCT}$ by the weighted sum of the motion vector pair $MV_{3a}$ and $MV_{3b}$ with the weighted factors of ½.

According to another embodiment, the motion vector pair $MV_{3a}$ and $MV_{3b}$ may be assigned with different weighted factors. As such, the motion vector $MV_2$ may be directly replaced or padded by either one of the motion vectors $MV_{3a}$ and $MV_{3b}$ having a greater weighted factor than the other.

It should be noted that other weighted factor rules can be applied as desired, in addition to the assignment or padding method described above.

Alternatively, for the case when the motion vector pair $MV_{3a}$ and $MV_{3b}$ is inconsistent, the motion inconsistency may result in a relatively high risk of motion vector correction failure. Thus, the motion vector correction unit 108 directs the weighted factor assigned to the motion vector $MV_2$ have a larger value than the weighted factors assigned to the motion vector pair $MV_{3a}$ and $MV_{3b}$, so as to remove extraneous variations from the motion vector pair $MV_{3a}$ and $MV_{3b}$. For example, the motion vector pair $MV_{3a}$ and $MV_{3b}$ is weighted with zero weighted factors, and thus the motion vectors $MV_2$ weighted with a weighted factor of 1 remains the same, without any further motion vector correction.

Figure 5:
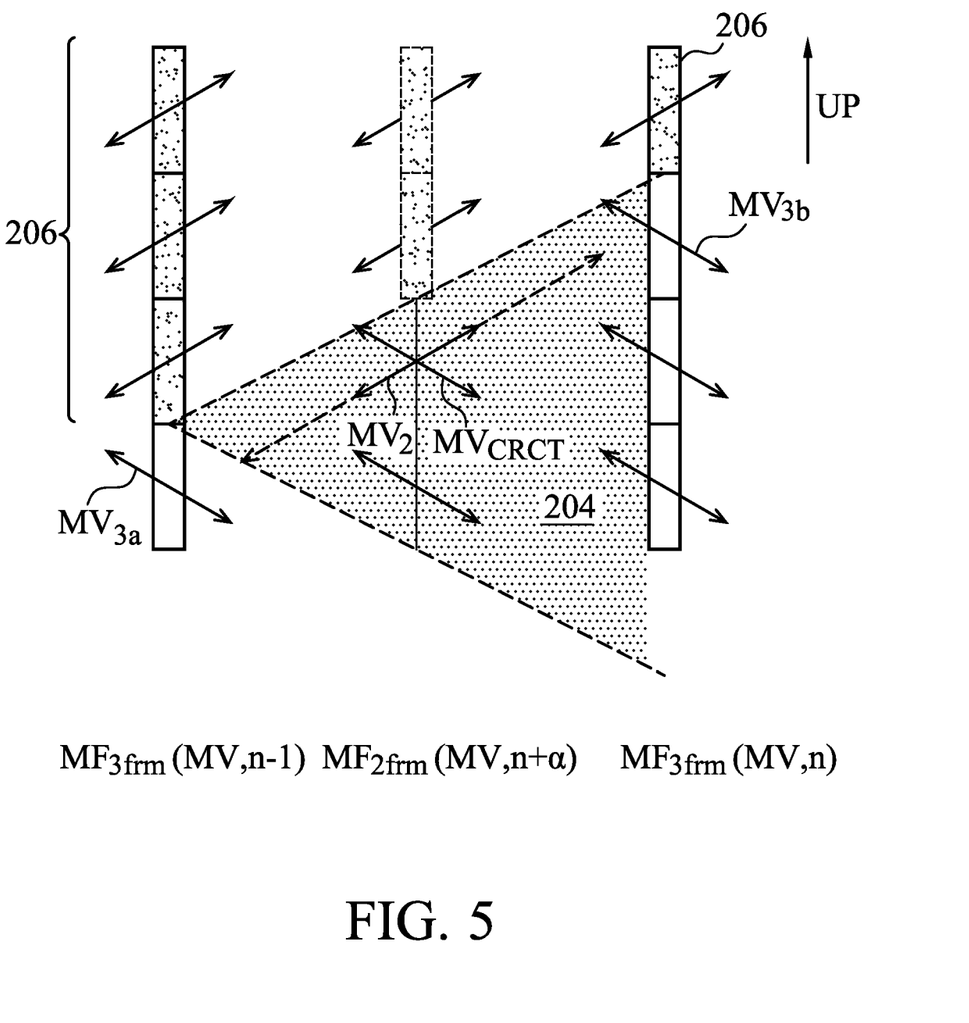
FIG. 5 is a diagram illustrating an operation of correcting motion vectors located in an uncovered area according to the embodiment of FIG. 3.

FIG. 5 is a diagram illustrating an operation of correcting motion vectors located in an uncovered area 204 according to the embodiment of FIG. 3. Similarly, candidate motion vector selected from the intermediate motion vector field 122 is set as the estimated motion vector of the interpolated frame $frm_{n+\alpha}$ to be corrected. It is noted that the location of the candidate motion vector in the intermediate motion vector field 122 corresponds to that of the pixel in the interpolated frame $frm_{n+\alpha}$.

Referring to FIG. 5, when a motion vector $MV_2$ within the uncovered area 204 is selected, two corresponding motion vectors $MV_{3a}$ and $MV_{3b}$ are determined in the direction of the motion vector $MV_2$. Next, the motion vector correction unit 108 calculates an absolute value of the difference between the motion vector pair $MV_{3a}$ and $MV_{3b}$. Then, the motion vector correction unit 108 compares the calculated absolute value of the difference with a predetermined threshold, so as to determine whether the motion vectors $MV_{3a}$ and $MV_{3b}$ are consistent or not.

When the absolute value of the difference is equal to or smaller than the predetermined threshold, the motion vectors $MV_{3a}$ and $MV_{3b}$ are determined to be consistent. The ensured motion consistency between the motion vectors $MV_{3a}$ and $MV_{3b}$ assures a reliable estimation for correcting the motion vector $MV_2$. For example, equal weighted factors are assigned to the motion vectors $MV_{3a}$ and $MV_{3b}$ to obtain a new motion vector $MV_{CRCT}$ by the weighted sum of the motion vectors $MV_{3a}$ and $MV_{3b}$ with their equal weighted factors.

Otherwise, when the absolute value of the difference between the motion vectors $MV_{3a}$ and $MV_{3b}$ is greater than the predetermined threshold, the motion vectors $MV_{3a}$ and $MV_{3b}$ are determined to be inconsistent. Such inconsistent motion vectors $MV_{3a}$ and $MV_{3b}$ may result in an uncertain estimation for correcting the motion vector $MV_2$. Thus, the weighted factor assigned to the motion vector $MV_{2,v}$ is a leading reference for self-correction. For example, a larger weighted factor is assigned to the motion vector $MV_2$ while two smaller weighted factors are assigned to the motion vectors $MV_{3a}$ and $MV_{3b}$. Therefore, a new motion vector $MV_{CRCT}$ is obtained by the weighted sum of the motion vectors $MV_2$, $MV_{3a}$ and $MV_{3b}$ with the respective weighted factors.

According to an embodiment, it is assumed that the object 206 in FIG. 5 is in accelerating or retarding motion within a motion vector $MV_2$ of −6. The two corresponding motion vectors $MV_{3a}$ of 4 and $MV_{3b}$ of 8 are selected according to the motion vector $MV_2$. Also, the predetermined threshold is set to 6. In the illustrated embodiment, the motion vectors $MV_{3a}$ and $MV_{3b}$ are consistent since an absolute value of the difference between the motion vectors $MV_{3a}$ and $MV_{3b}$, i.e., $abs(MV_{3a}-MV_{3b})=abs(4-8)=4$, is smaller than the predetermined threshold of 6. That is, the consistent motion vectors $MV_{3a}$ and $MV_{3b}$ indicate that it is better to correct the motion vector $MV_2$ of the motion vector field $MF_{2frm}(MV,n+\alpha)$ between 4 and 8, rather than −6. In one embodiment, the weighted factors for the motion vectors $MV_2$, $MV_{3a}$ and $MV_{3b}$ are respectively set to 0, ½ and ½. Thus, the correcte d motion vector $MV_{CRCT'}$ is accordingly derived by the weighted sum of the motion vectors, i.e., $(MV_2 \times 0 + MV_{3a} \times 0.5 + MV_{3b} \times 0.5) = (0 + 4 \times 0.5 + 8 \times 0.5) = 6$.

Further, the corrected motion vector $MV_{CRCT}$ is utilized to direct a motion compensation unit to generate the interpolated frame $frm_{n+\alpha}$ as shown in FIG. 2 in accordance with the motion vector field $MF_{2frm}(MV,n+\alpha)$, thereby eliminating or reducing judder effects of motion.

Figure 6:
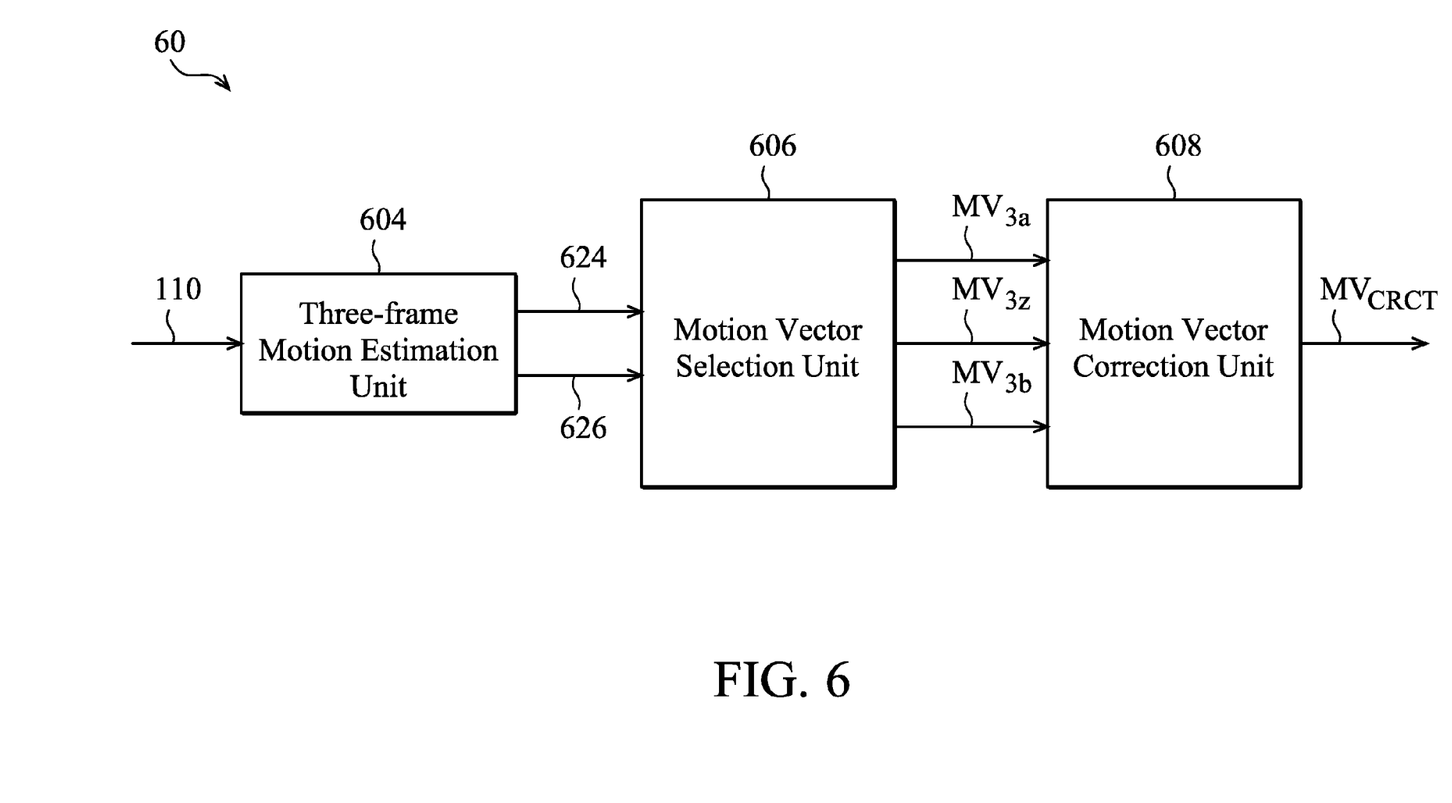
FIG. 6 is a block diagram illustrating a motion vector correction apparatus according to another embodiment of the invention.

FIG. 6 is a block diagram illustrating a motion vector correction apparatus 60 according to another embodiment of the invention. As shown in FIG. 6, the motion vector correction apparatus 60 comprises a three-frame motion estimation unit 604, a motion vector selection unit 606 and a motion vector correction unit 608.

In this embodiment, the estimated motion vector of the interpolated frame $frm_{n+\alpha}$ as shown in FIG. 2 are corrected by the set of reference motion vectors only derived from the three-frame motion estimation unit 604, so that there is no need to make use of the two-frame motion estimator intermediated from the two frames $frm_{n-1}$ and $frm_n$, i.e., the intermediate motion vector field 122 from the two-frame motion estimation unit 102 of FIG. 1. More specifically, the three-frame motion estimation unit 604 estimates a previous motion vector field 624 (i.e., $MF_{3frm}(MV,n-1)$) and a following motion vector field 626 (i.e., $MF_{3frm}(MV,n)$) according to the aforementioned function (2) and (3). The process of correcting the erroneous motion vectors located in a uncovered area and a covered area will be described below in more detail with reference to FIGS. 7 and 8.

Figure 7:
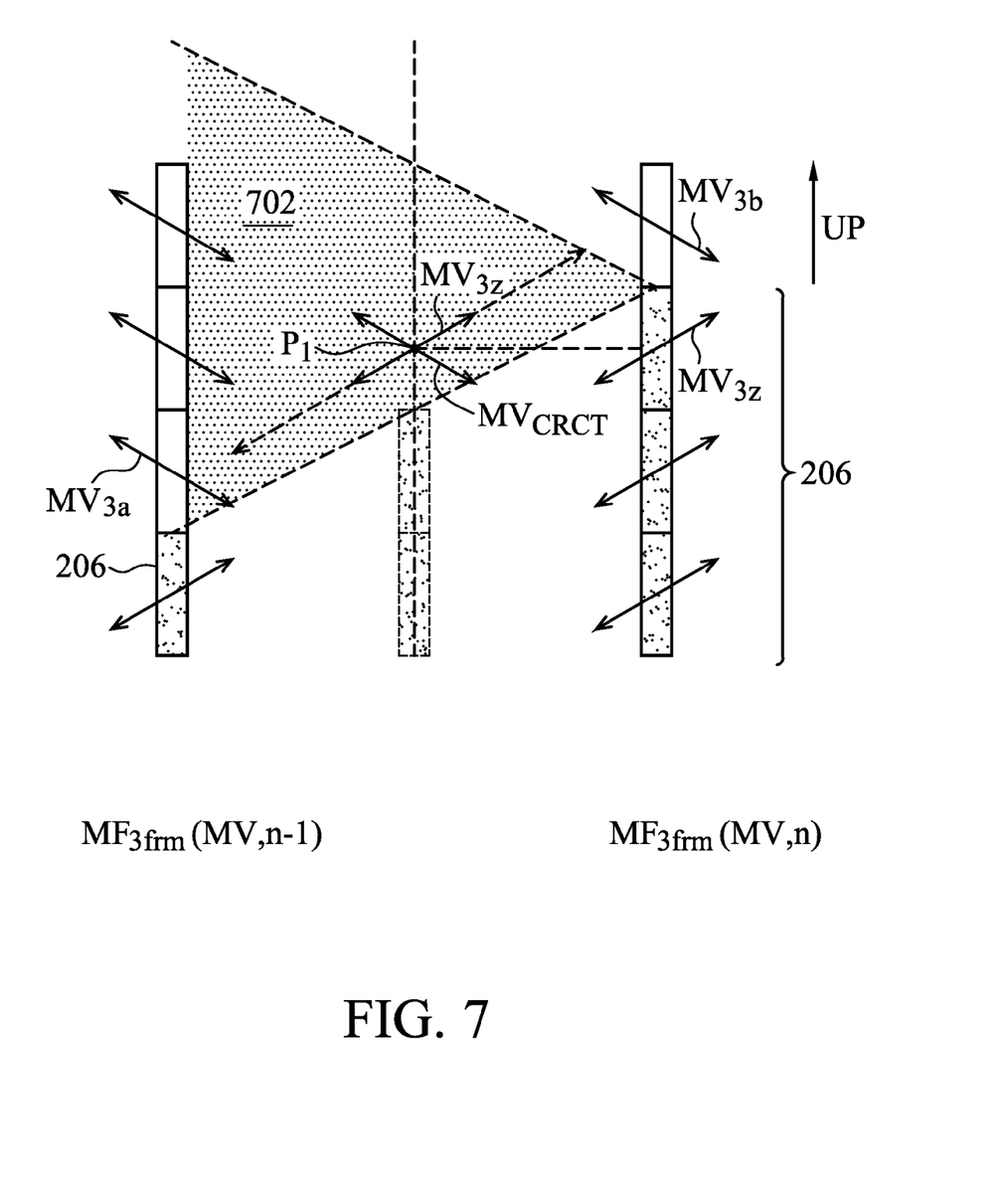
FIG. 7 is a diagram illustrating an operation of correcting motion vectors located in a covered area according to the embodiment of FIG. 6.

FIG. 7 is a diagram illustrating an operation of correcting motion vectors located in a covered area 702 according to the embodiment of FIG. 6.

Figure 8:
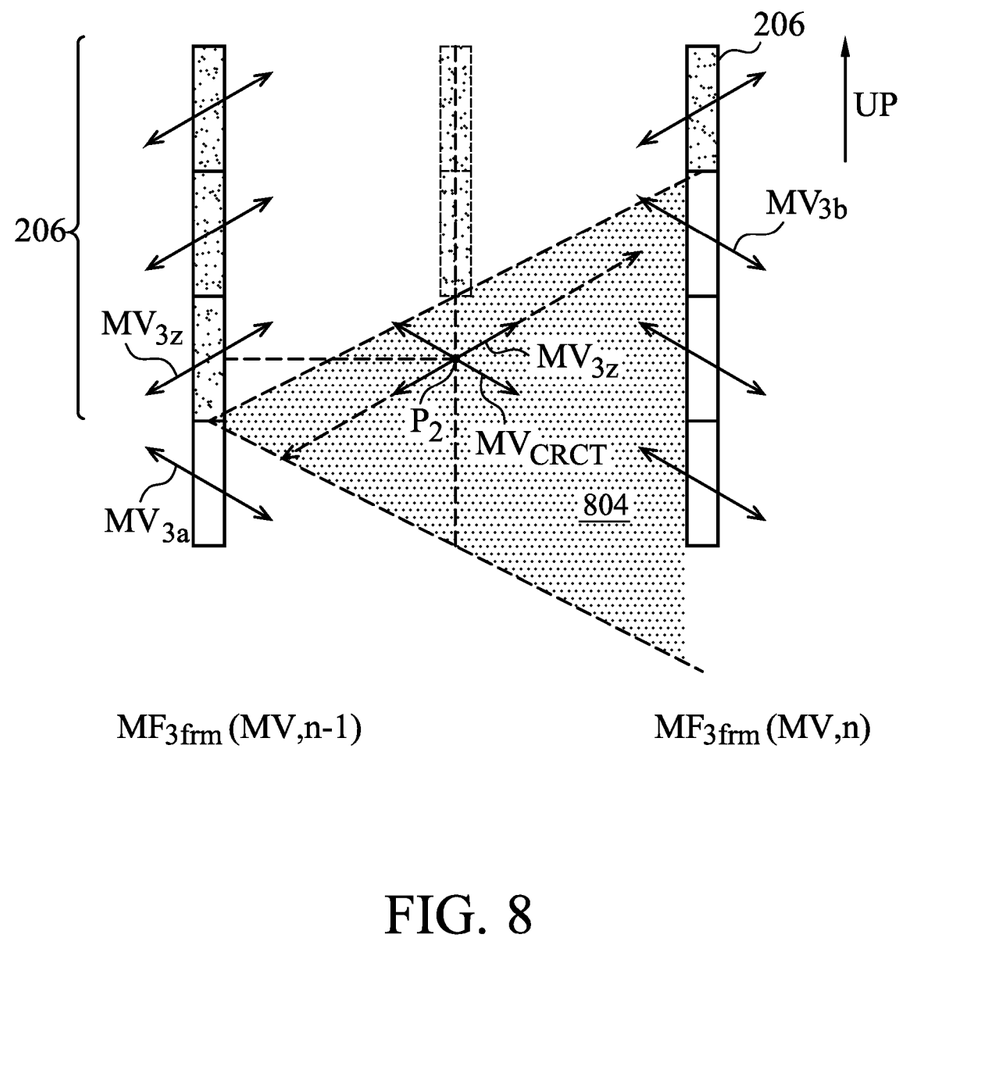
FIG. 8 is a diagram illustrating an operation of correcting motion vectors located in an uncovered area according to the embodiment of FIG. 6.

FIG. 8 is a diagram illustrating an operation of correcting motion vectors located in an uncovered area 804 according to the embodiment of FIG. 6.

As shown in FIGS. 7 and 8, an object 206 moves with a specific speed over a background and in an upward direction UP.

During operation, when an estimated motion vector of the interpolated frame $frm_{n+\alpha}$ is specified to be corrected, the set of reference motion vectors is then determined by selecting a plurality of motion vectors from the motion vector fields 624 and 626 according to the located position of the specified motion vector.

According to an embodiment, as shown in FIG. 7, it is assumed that a motion vector to be corrected for a pixel is located at a position P1 of the interpolated frame $frm_{n+\alpha}$. As such, the motion vector selection unit 606 may select a candidate motion vector, which is located at a position corresponding to the position P1, from either the motion vector field $MF_{3frm}(MV,n-1)$ or $MF_{3frm}(MV,n)$. Referring to FIG. 7, because the position P1 is located in the covered area 702, a motion vector $MV_3$, from the motion vector field $MF_{3frm}(MV,n)$ is selected and set as the motion vector to be corrected. Accordingly, the motion vector selection unit 106 determines a pair of corresponding motion vectors $MV_{3a}$ and $MV_{3b}$ in the direction of the motion vector $MV_{3z}$.

According to another embodiment, as shown in FIG. 8, when a motion vector to be corrected for a pixel is located at a position P2 within the uncovered area 804, another motion vector $MV_3$, from the motion vector field $MF_{3frm}(MV,n-1)$ is subsequently selected and set as the motion vector to be corrected. Therefore, the motion vector selection unit 106 determines a pair of corresponding motion vectors $MV_{3a}$ and $MV_{3b}$ in the direction of another motion vector $MV_{3z}$.

Next, the three motion vectors $MV_{3z}$, $MV_{3a}$ and $MV_{3b}$ are passed to the motion vector correction unit 608. As a result, the motion vector correction unit 608 corrects the motion vector $MV_{3z}$ of the covered area 702/uncovered area 804 to a new $MV_{CRCT}$ according to the three motion vectors $MV_{3z}$, $MV_{3a}$ and $MV_{3b}$. Since the operation of the motion vector correction unit 608 is substantially the same as that of the embodiment shown in FIG. 1, repeated description thereof is omitted.

It is further noted that when an estimated motion vector of the interpolated frame $frm_{n+\alpha}$ is specified to be corrected, the motion vector selection unit 606 in FIG. 6 may also select two candidate motion vectors respectively from the motion vector fields 624 and 626 according to the position of the specified motion vector. That is, the two candidate motion vectors are located at respectively positions corresponding to the position of the specified motion vector. Afterward, the two candidate motion vectors are interpolated to generate a motion vector $MV_{3z}$ for further correction.

Figure 9:
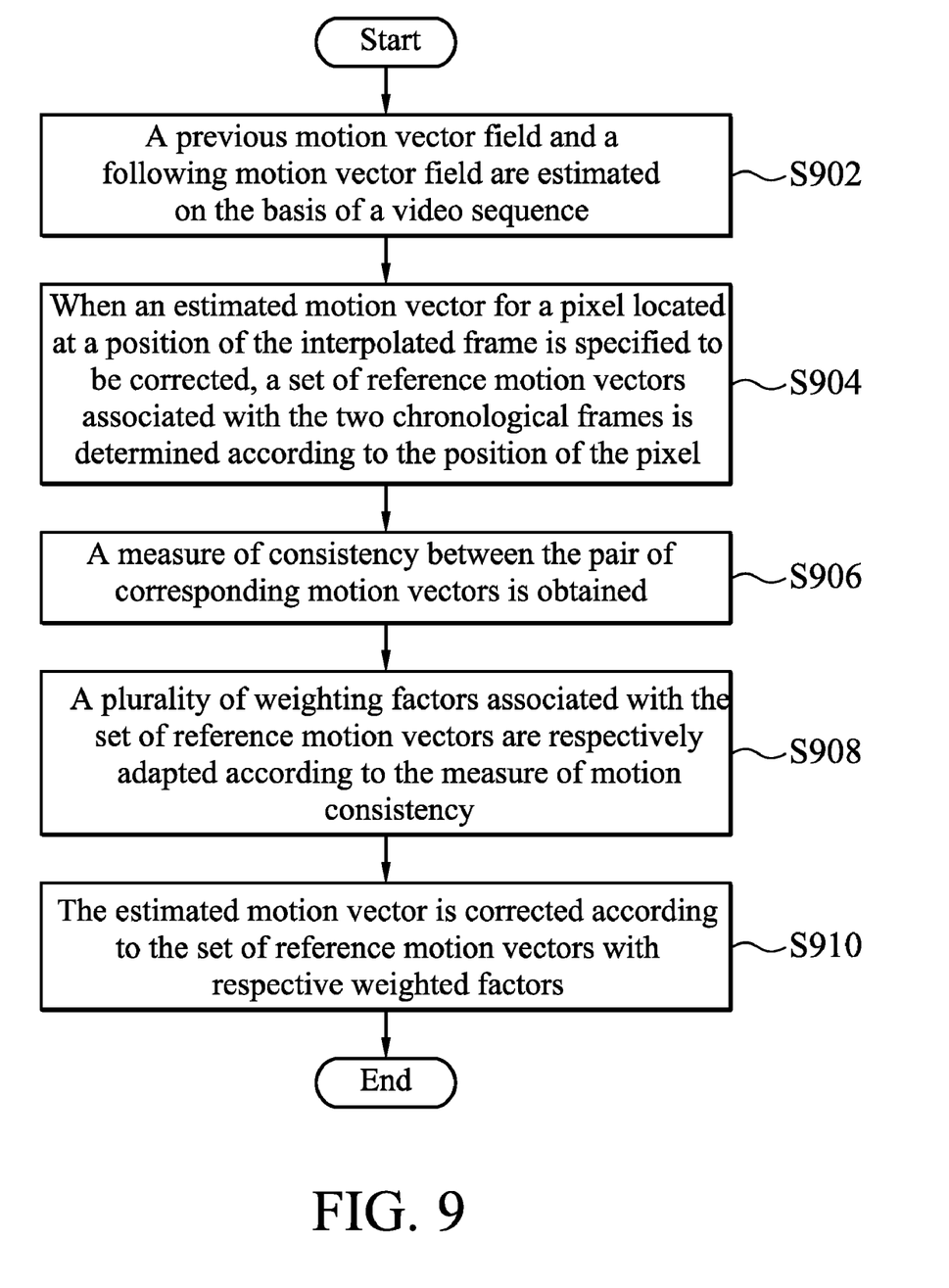
FIG. 9 is a flowchart illustrating a motion vector correction method according to an embodiment of the invention.

FIG. 9 is a flowchart illustrating a motion vector correction method according to an embodiment of the invention.

Referring to FIGS. 1, 6 and 9, upon receiving a video sequence 110, a previous motion vector field $MF_{3frm}(MV,n-1)$ and a following motion vector field $MF_{3frm}(MV,n)$ are estimated by the three-frame motion estimation unit 104 or 604 (step S902). The two motion vector field $MF_{3frm}(MV,n-1)$ and $MF_{3frm}(MV,n)$ are used to facilitate the estimation of an interpolated frame $frm_{n+\alpha}$ between two chronological frames $frm_{n-1}$ and $frm_n$, as shown in FIG. 2.

According to the function (2), the motion vector field $MF_{3frm}(MV,n-1)$ is determined on the basis of the first frame $frm_n$, the second frame $frm_{n-1}$ and a third frame $frm_{n-2}$ preceding the second frame $frm_{n-1}$. In addition, according to the function (3), the motion vector field $MF_{3frm}(MV,n)$ is determined on the basis of the first frame $frm_n$, the second frame $frm_{n-1}$ and a fourth frame $frm_{n+1}$ following the first frame $frm_n$. From the aforementioned description, the four frames $frm_{n-2}$, $frm_{n-1}$, $frm_n$ and $frm_{n+1}$ may represent successive frames or discrete frames by a certain time interval in the video sequence 110.

Next, when an estimated motion vector for a pixel located at a position of the interpolated frame $frm_{n+\alpha}$ is specified to be corrected, a set of reference motion vectors associated with the two chronological frames $frm_{n-1}$ and $frm_n$ is then determined according to the position of the pixel (step S904).

According to an embodiment, the set of reference motion vectors may be determined by selecting a candidate motion vector from an intermediate motion vector field 122 (such as $MF_{2frm}(MV,n+\alpha)$ set forth in function (1)) based on the position of the pixel. That is, the candidate motion vector is located at a position corresponding to that of the pixel. The candidate motion vector, e.g., $MV_2$ in the covered area 202 of FIG. 4, is set as the estimated motion vector for further correction.

According to another embodiment, the set of reference motion vectors may be determined by the two three-frame motion estimators $MF_{3frm}(MV,n-1)$ and $MF_{3frm}(MV,n)$, without any two-frame motion estimatior, e.g., $MF_{2frm}(MV, n+\alpha)$. In one case, a candidate motion vector may be selected from one of the motion vector fields $MF_{3frm}(MV,n-1)$ and $MF_{3frm}(MV,n)$. Also, the candidate motion vector is located at a position corresponding to that of the pixel. The candidate motion vector, e.g., $MV_3$, located at the position P1 in the covered area 702 as shown in FIG. 7, is set as the estimated motion vector for further correction. In other case, two candidate motion vectors respectively from the motion vector fields $MF_{3frm}(MV,n-1)$ and $MF_{3frm}(MV,n)$ may also be interpolated to generate a motion vector, which is set as the estimated motion vector for further correction.

After the estimated motion vector to be corrected is specified, e.g., $MV_2$ in FIG. 4, the set of reference motion vectors is determined by selecting a pair of corresponding motion vectors respectively from the motion vector fields $MF_{3frm}(MV,n-1)$ and $MF_{3frm}(MV,n)$. As described above, the pair of corresponding motion vectors is determined in the direction of the motion vector $MV_2$. In the illustrated example of FIG. 4, based on a line extending in the direction of the motion vector $MV_2$, a pair of corresponding motion vectors $MV_{3a}$ and $MV_{3b}$ are subsequently determined from the motion vector fields $MF_{3frm}(MV,n-1)$ and $MF_{3frm}(MV,n)$.

Following, the motion vector correction unit 108 in FIG. 1 obtains a measure of consistency between the motion vector pair $MV_{3a}$ and $MV_{3b}$ (step S906). For example, the motion vector correction unit 108 determines whether the motion vectors $MV_{3a}$ and $MV_{3b}$ are consistent or inconsistent according to a predetermined threshold. Note that, since operation for checking for consistency was described in the aforementioned descriptions of the embodiments of the invention, repeated description thereof will be omitted.

According to the measure of motion consistency between the motion vectors $MV_{3a}$ and $MV_{3b}$, a plurality of weighted factors associated with the set of reference motion vectors are respectively adapted for correcting the estimated motion vector of the interpolated frame $frm_{n+\alpha}$ (step S908). As illustrated in the embodiments of FIG. 4, a plurality of weighted factors are respectively assigned to the motion vectors $MV_2$, $MV_{3a}$ and $MV_{3b}$ for correcting the motion vector $MV_2$. More specifically, when the motion vector $MV_{3a}$ is inconsistent with the motion vector $MV_{3b}$, both will be weighted by a relatively low weighted factor or zero weighted factor. That is, the motion vector $MV_2$ provides a reliable estimation for self-correction. Otherwise, when the motion vectors $MV_{3a}$ and $MV_{3b}$ are consistent, they act as reliable references to correct the motion vector $MV_2$.

Finally, the estimated motion vector, e.g., $MV_2$ in the covered area 202 of FIG. 4, is corrected according to the set of reference motion vectors, e.g., $MV_2$, $MV_{3a}$ and $MV_{3b}$ in FIG. 4, with respective weighted factors (step S910). A motion-compensated interpolation of frames $frm_n$ and $frm_{n-1}$ is then performed to generate the interpolated frame $frm_{n+\alpha}$ with no or less halo artifacts occurring in the boundary of the fast moving object according to the corrected motion vector, e.g., $MV_{CRCT}$ as shown in FIG. 4.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A motion vector correction method for correcting an estimated motion vector for a pixel located at a position of an interpolated frame between a first frame and a second frame of a video sequence, comprising:

estimating a previous motion vector field and a following motion vector field, wherein the previous motion vector field is estimated on the basis of the first frame, the second frame and a third frame preceding the second frame and the following motion vector field is estimated on the basis of the first frame, the second frame and a fourth frame following the first frame;

determining a set of reference motion vectors associated with the first frame and the second frame for the position of the pixel, wherein the set of reference motion vectors comprises a first motion vector set as the estimated motion vector and a pair of corresponding motion vectors respectively from the previous motion vector field and the following motion vector field;

obtaining a measure of consistency between the pair of corresponding motion vectors;

adapting a plurality of weighted factors respectively associated with the set of reference motion vectors according to the measure of consistency; and correcting the estimated motion vector according to the adapted weighted factors and the set of reference motion vectors.

2. The method as claimed in claim 1, wherein the first motion vector set as the estimated motion vector is determined by selecting a candidate motion vector from either the previous motion vector field or the following motion vector field, and the candidate motion vector is located at a position corresponding to the position of the pixel.

3. The method as claimed in claim 1, wherein the first motion vector set as the estimated motion vector is determined by interpolating two candidate motion vectors from the previous motion vector field and the following motion vector field, and the two candidate motion vectors are located at respectively positions corresponding to the position of the pixel.

4. The method as claimed in claim 1, wherein the first motion vector set as the estimated motion vector is determined according to a candidate motion vector from an intermediate motion vector field being estimated on the basis of the first frame and the second frame, and the candidate motion vector is located at a position corresponding to the position of the pixel.

5. The method as claimed in claim 1, wherein obtaining the measure of consistency comprises the step of:

determining whether the pair of corresponding motion vectors are consistent or inconsistent according to a predetermined threshold.

6. The method as claimed in claim 5, wherein adapting the weighted factors comprises the step of:

making the weighted factor for the first motion vector smaller than the weighted factors for the pair of corresponding motion vectors when the pair of corresponding motion vectors are consistent.

7. The method as claimed in claim 5, wherein adapting the weighted factors comprises the step of:

making the weighted factor for the first motion vector larger than the weighted factors for the pair of corresponding motion vectors when the pair of corresponding motion vectors are inconsistent.

8. The method as claimed in claim 1, wherein the estimated motion vector is corrected by a weighted sum of the first motion vector and the pair of corresponding motion vectors using respective weighted factors.

9. The method as claimed in claim 1, wherein the estimated motion vector is replaced by either one of the corresponding motion vectors which has a larger weighted factor than the other.

10. The method as claimed in claim 5, wherein the pair of corresponding motion vectors is determined to be consistent or inconsistent by comparing the predetermined threshold with an absolute value of the difference between the pair of corresponding motion vectors.

11. The method as claimed in claim 1, wherein the first frame, the second frame, the third frame and the fourth frame are successive frames in the video sequence.

12. The method as claimed in claim 1, wherein the first frame, the second frame, the third frame and the fourth frame are chronologically discrete frames in the video sequence.

13. A motion vector correction apparatus for correcting an estimated motion vector for a pixel located at a position of an interpolated frame between a first frame and a second frame of a video sequence, comprising:
- a three-frame motion estimation unit for estimating a previous motion vector field and a following motion vector field, wherein the previous motion vector field is estimated on the basis of the first frame, the second frame and a third frame preceding the second frame and the following motion vector field is estimated on the basis of the first frame, the second frame and a fourth frame following the first frame;
- a motion vector selection unit coupled to the three-frame motion estimation unit for determining a set of reference motion vectors associated with the first frame and the second frame for the position of the pixel, wherein the set of reference motion vectors comprises a first motion vector set as the estimated motion vector and a pair of corresponding motion vectors respectively from the previous motion vector field and the following motion vector field; and
- a motion vector correction unit coupled to the motion vector selection unit for obtaining a measure of consistency between the pair of corresponding motion vectors, adapting a plurality of weighted factors respectively associated with the set of reference motion vectors according to the measure of consistency, and correcting the estimated motion vector according to the adapted weighted factors and the set of reference motion vectors.

14. The apparatus as claimed in claim 13, wherein the motion vector selection unit determines the first motion vector set as the estimated motion vector by selecting a candidate motion vector from either the previous motion vector field or the following motion vector field, and the candidate motion vector is located at a position corresponding to the position of the pixel.

15. The apparatus as claimed in claim 13, wherein the motion vector selection unit determines the first motion vector set as the estimated motion vector by interpolating two candidate motion vectors from the previous motion vector field and the following motion vector field, and the two candidate motion vectors are located at respectively positions corresponding to the position of the pixel.

16. The apparatus as claimed in claim 13 further comprising:
- a two-frame motion estimation unit for estimating an intermediate motion vector field on the basis of the first frame and the second frame,
- wherein the motion vector selection unit determines the first motion vector set as the estimated motion vector according to a candidate motion vector from the intermediate motion vector field, and the candidate motion vector is located at a position corresponding to the position of the pixel.

17. The apparatus as claimed in claim 13, wherein the motion vector correction unit obtains the measure of consistency by determining whether the pair of corresponding motion vectors is consistent or inconsistent according to a predetermined threshold.

18. The apparatus as claimed in claim 17, wherein the motion vector correction unit makes the weighted factor for the first motion vector smaller than the weighted factors for the pair of corresponding motion vectors when the pair of corresponding motion vectors are consistent.

19. The apparatus as claimed in claim 17, wherein the motion vector correction unit makes the weighted factor for the first motion vector larger than the weighted factors for the pair of corresponding motion vectors when the pair of corresponding motion vectors are inconsistent.

20. The apparatus as claimed in claim 13, wherein the estimated motion vector is corrected by a weighted sum of the first motion vector and the pair of corresponding motion vectors using respective weighted factors.

21. The apparatus as claimed in claim 13, wherein the estimated motion vector is replaced by either one of the corresponding motion vectors which has a largest weighted factor.

22. The apparatus as claimed in claim 17, wherein the pair of corresponding motion vectors is determined to be consistent or inconsistent by comparing the predetermined threshold with an absolute value of the difference between the pair of corresponding motion vectors.

23. The apparatus as claimed in claim 13, wherein the first frame, the second frame, the third frame and the fourth frame are successive frames in the video sequence.

24. The apparatus as claimed in claim 13, wherein the first frame, the second frame, the third frame and the fourth frame are chronologically discrete frames in the video sequence.

* * * * *